United States Patent [19]

Harrison et al.

[11] 4,334,885
[45] Jun. 15, 1982

[54] PRODUCTION OF POTASSIUM CHLORIDE FROM LANGBEINITE

[75] Inventors: Marvin H. Harrison; William B. Dancy, both of Carlsbad, N. Mex.

[73] Assignee: International Minerals & Chemical Corp., Terre Haute, Ind.

[21] Appl. No.: 198,391

[22] Filed: Oct. 20, 1980

[51] Int. Cl.³ .......................... C01D 3/08; C01D 3/24
[52] U.S. Cl. ................................ 23/300; 23/302 R; 71/61; 71/63; 423/499
[58] Field of Search ............... 423/197, 199, 499, 551, 423/552; 23/300, 301, 302 R; 71/61, 63, 64.13

[56] References Cited

U.S. PATENT DOCUMENTS

| | | | |
|---|---|---|---|
| 1,302,937 | 5/1919 | Leonis ................................. | 423/197 |
| 1,354,642 | 10/1920 | Anderson et al. .................. | 423/197 |
| 2,684,285 | 7/1954 | Dancy ................................. | 23/121 |
| 3,429,657 | 2/1969 | George et al. ...................... | 423/552 |
| 3,440,023 | 4/1969 | Hoppe et al. ...................... | 23/301 R |
| 3,910,773 | 10/1975 | Garrett et al. ..................... | 23/301 R |

Primary Examiner—Gregory N. Clements
Attorney, Agent, or Firm—H. J. Barnett

[57] ABSTRACT

An improved method of producing potassium sulfate from langbeinite. The improved method employs a "salting out" step to remove additional KCl from the mother liquor resulting from $K_2SO_4$ crystallization. NaCl is added to the mother liquor to cause precipitation of KCl crystals. The amount of NaCl added is controlled to an amount below the saturation point for NaCl in the solution to avoid contaminating the KCl with solid NaCl. The KCl crystals are recycled back to the $K_2SO_4$ reactors as a source of KCl. The "salting out" step eliminates an energy-intensive submerged combustion evaporation step from the $K_2SO_4$ recovery process and consequently reduces atmospheric emissions.

In certain material balance situations, excess end liquor resulting from the above "salting out" operation can be subjected to evaporation (solar evaporation being preferred) to recover the remaining sodium and potassium values, and to produce a concentrated magnesium chloride solution which is useful in the primary langbeinite/sylvinite ore refining cycle to inhibit undesirable glaserite formation. The sodium and potassium salts obtained from evaporation can be recycled to the "salting out" step.

15 Claims, 3 Drawing Figures

PRODUCTION OF POTASSIUM CHLORIDE FROM LANGBEINITE

BACKGROUND

Potassium sulfate is an important fertilizer ingredient and is obtained from many mineral sources, including langbeinite and sylvite ores containing halite impurities which are found near Carlsbad, New Mexico. A method of recovering potassium sulfate from langbeinite ($K_2SO_4.2MgSO_4$ plus @4% NaCl) is described in U.S. Pat. No. 2,684,285 issued to W. B. Dancy.

In the method disclosed in the above patent, finely pulverized langbeinite is reacted with potassium chloride to produce potassium sulfate. The reaction of langbeinite and potassium chloride is conducted in a solution approaching saturation with poatssium chloride to obtain a conversion of about 42% of the potassium salts to potassium sulfate. The remaining 58% of the potassium remains in the liquor phase. Crystals of potassium sulfate are separated from the mother liquor (reaction mixture) and the remaining mother liquor which still contains dissolved salts of potassium is evaporated to just short of the point at which sodium chloride crystals would be formed. Submerged combustion evaporation is used to remove water, and vacuum crystallization is used to keep the temperature of the mother liquor below its atmospheric boiling temperature to enhance mixed crystal formation. The resulting slurry is cooled, the mixed crystals are separated, and then recycled to the reaction mixture.

The above method of recovering additional potassium salts from the mother liquor by means of submerged combustion evaporation is energy-intensive, and with escalating fuel costs the evaporation step has become a major cost burden. In addition, water has become a more precious commodity in the desert location and must be conserved to the extent possible.

Under the method of the subject invention the process has been modified from the method described above to eliminate the submerged combustion evaporation of the mother liquor. This step is replaced by a "salting out" crystallization step by which sodium chloride is added to the mother liquor which contains potassium salts to cause additional potassium salts to crystallize, mainly as potassium chloride, and to settle out of the mother liquor. The new method eliminates the evaporation step just described, and results in a substantial energy saving to reduce production costs. It also eliminates stack emissions into the atmosphere formerly associated with the evaporation step and avoids addition of costly emission control equipment which would be required to comply with new government regulations. In addition to the large initial capital cost of such emission control equipment, there is an ongoing added energy cost burden for their operation.

In the production of potassium sulfate, the use of the subject "salting out" process has been found to eliminate about 90% of the fuel energy requirements formerly required for that operation before the "salting out" process replaced the submerged combustion evaporation step. In addition, a significant cost saving is realized by elimination of ammonia to control pH in the evaporators which tended to form strong acids which required neutralization.

*DAS KALI*, Part II, edited by Dr. Ernst Fulda and published in Stuttgart, Germany (1928) pages 326-329 describes the processing of complex ores to recover magnesium chloride. Sodium chloride is an impurity in the solid mixed salts obtained. A mother liquor from the process is added to the mixed salts, which contain a large amount of potassium chloride, and smaller amounts of magnesium chloride and sodium chloride. The magnesium chloride salt is more soluble and is dissolved into the mother liquor, leaving only the potassium chloride and sodium chloride in crystalline salt form, and these mixed salts are separated from the mother liquor, and further refined at high temperatures to separate the potassium chloride and sodium chloride by conventional crystallization procedure.

The above described process is really a "leaching out" process which is the opposite of the "salting out" process of the subject invention. The starting material is a mixture of solid salts, including magnesium chloride, potassium chloride and sodium chloride. Magnesium chloride is "leached" out, and the potassium chloride and sodium chloride are subjected to high temperatures to separate them by conventional crystallization procedures which are energy intensive. Control of the "leaching out" process is difficult, and the mineral, glaserite ($Na_2SO_4.3K_2SO_4$) is easily formed if an excess of sodium is present. In addition, this process may not be suitable because of water conservation requirements, and because of the reduced product value caused by the unintentional production of the glaserite impurity.

Applicants' process, by contrast, provides careful control of the amount of sodium chloride added back into the potassium sulfate reactors. This amount of sodium chloride added is intentionally kept just below the sodium chloride saturation level so that no sodium salt crystals are sent back to the potassium sulfate reactors with the potassium chloride crystals. Glaserite can be formed at relatively low concentrations of sodium chloride in the potassium sulfate reactors, and is an undesirable impurity which reduces the product value by depressing $K_2O$ values below those required to meet standard specifications for fertilizer products.

SUMMARY OF THE INVENTION

Potassium sulfate production from langbeinite uses substantially reduced thermal energy by a "salting out" step in which sodium chloride is added to the mother liquor remaining after initial potassium sulfate crystal separation according to the process described in U.S. Pat. No. 2,684,285. Sodium chloride is added in an amount up to, but below the saturation level for sodium chloride in the mother liquor to cause additional potassium chloride crystal precipitation from the mother liquor. The additional potassium chloride crystals are separated from the resulting end liquor by a suitable dewatering method, including vacuum filtration, centrifuging or thickening. The separated potassium chloride crystals are added back to the potassium sulfate reactors, or to the primary ore refining cycle to improve the yield of potassium sulfate.

The subject "salting out" process eliminates the intermediate mother liquor evaporation step required in the prior conventional process for making potassium sulfate from langbeinite ores, such as is disclosed in U.S. Pat. No. 2,684,285. A substantial production cost economy is realized by eliminating the energyintensive submerged combustion evaporation step, with consequent elimination of atmospheric emissions from the evaporators. Compliance with government clean air regulations without major capital outlays for sophisticated emission control equipment for these evaporators is also made possible, plus elimination of the continuing energy cost burden for operation of such emission control equipment.

GENERAL DESCRIPTION

Potassium sulfate is produced under the method described in U.S. Pat. No. 2,684,285, in which pulverized langbeinite (separated from a primary langbeinite/sylvite ore containing halite impurities) is reacted with potassium chloride according to the following chemical equation:

$$2MgSO_4.K_2SO_4 + 4KCl = 3K_2SO_4 + 2MgCl_2$$

The above reaction is conducted in water to keep the chloride content of the potassium sulfate solid salt product below 2.5% Cl. Magnesium chloride is very soluble and goes into solution, while the potassium sulfate remains in crystalline form in dilute magnesium chloride solutions. The potassium sulfate crystals are separated by centrifuge, leaving a mother liquor which still contains a high percentage of dissolved potassium salts (mostly potassium chloride), because an excess of potassium chloride is used to saturate the final magnesium chloride solution to get the best yield of potassium sulfate crystals. Experience has also dictated that the temperature during crystallization should be about 55° C. to produce the greatest amount of large potassium sulfate crystals. It is this "mother liquor" remaining after the potassium sulfate crystal removal which is subjected to the improved "salting out" process described herein.

Figure 1:
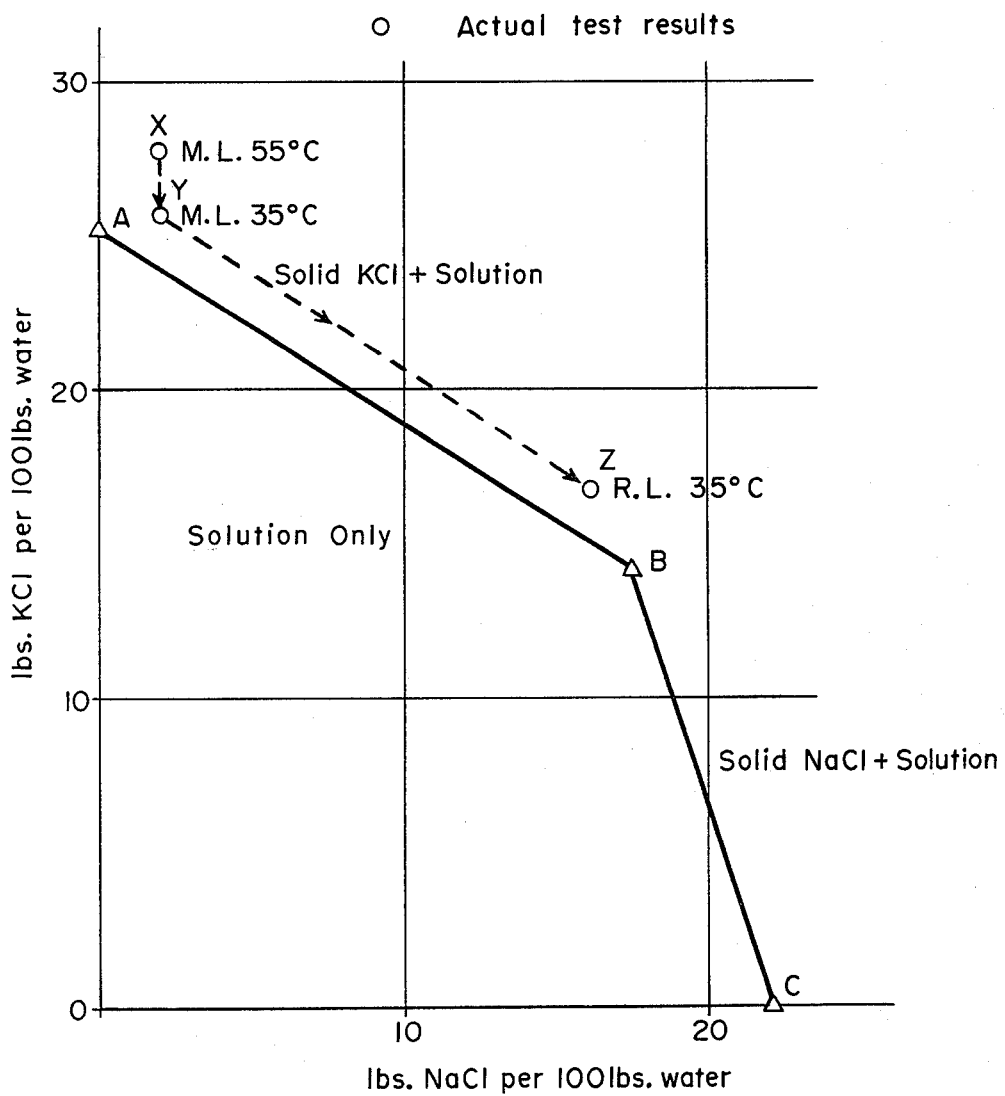
FIG. 1 is an isotherm diagram showing the "salting out" effect of carefully adding sodium chloride to the potassium sulfate process mother liquor which contains dissolved magnesium and potassium salts.
Figure 2:
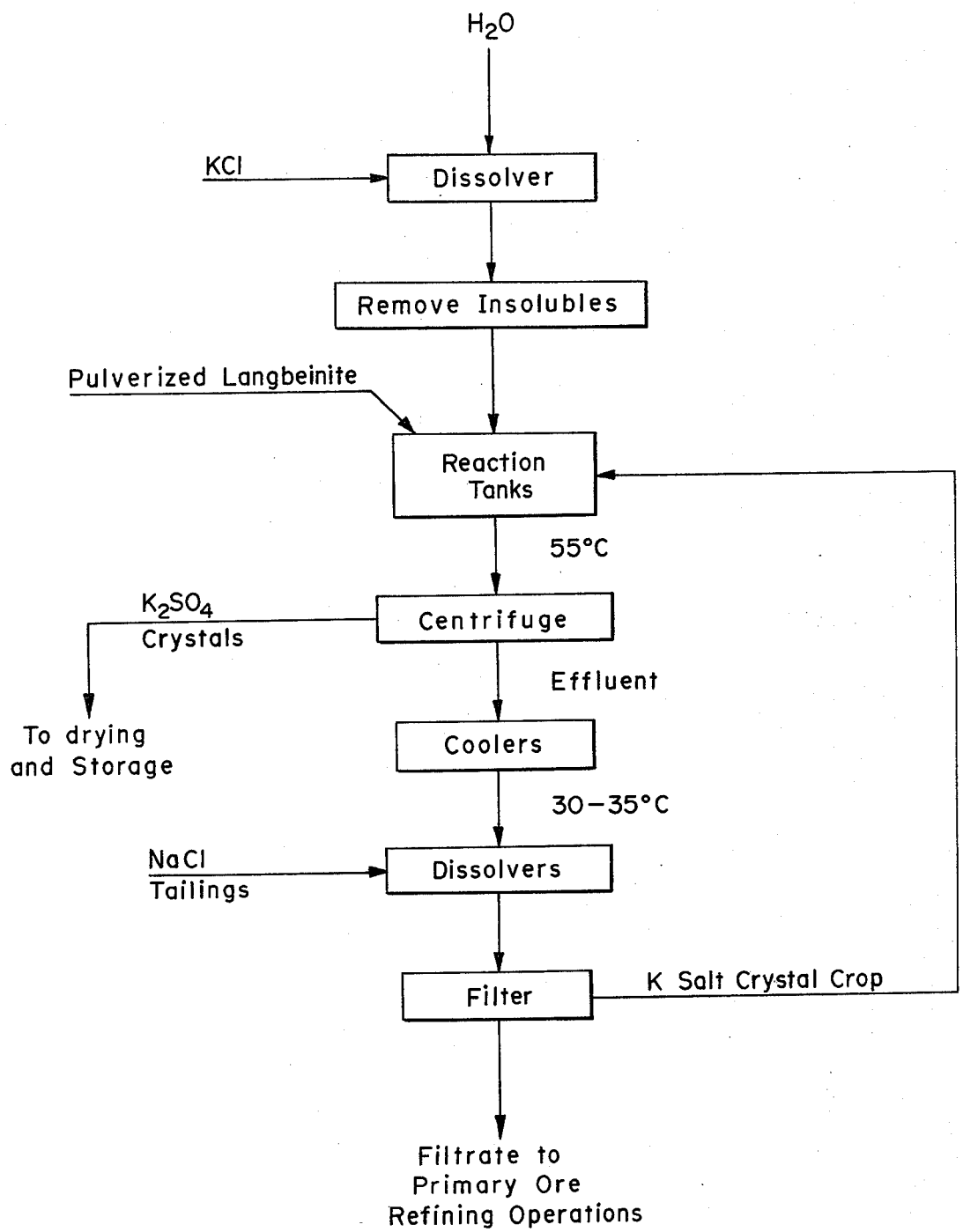
FIG. 2 of the drawings is a flow sheet showing operation of the improved potassium sulfate production process under the condition of an equilibrium water balance between potassium sulfate production and primary (langbeinite/sylvite) ore refining operations.

FIG. 1 of the drawings is a simplified isotherm diagram showing the "salting out" effect of adding sodium chloride to the mother liquor resulting after the potassium sulfate crystals have been removed. In the example illustrated in FIG. 1, the mother liquor initially contains about 25 pounds of potassium chloride at 35° C. per 100 pounds of water, and about 3.38 pounds of magnesium, primarily as magnesium chloride.

Figure 3:
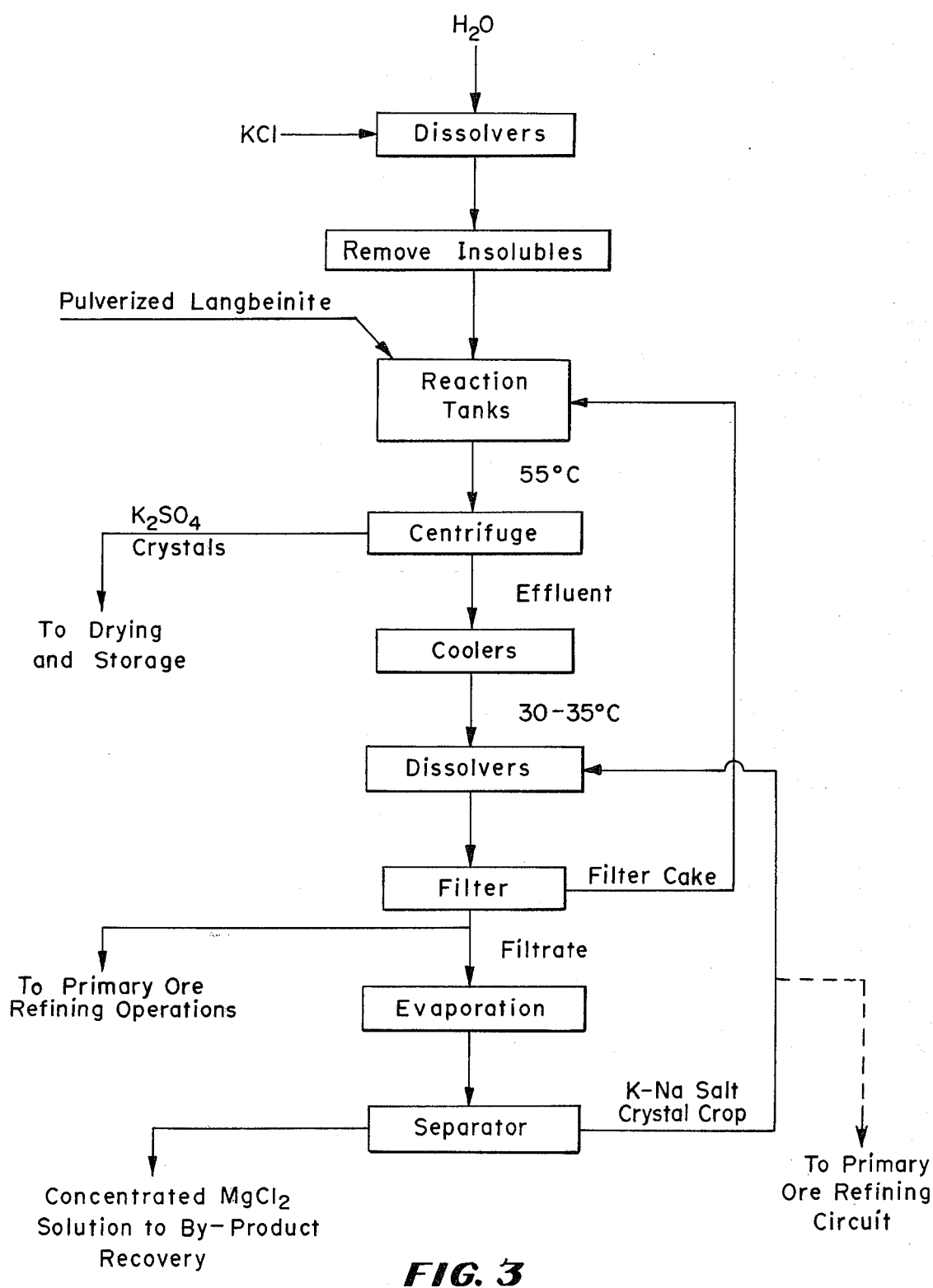
FIG. 3 of the drawings is a flow sheet showing operation of the improved potassium sulfate production process when the amount of end liquor generated by the potassium sulfate production exceeds the amount that can be used in the primary (langbeinite/sylvite) ore refining operations.

As shown in FIG. 3, the mother liquor (M.L.) is first cooled from about 55° C. to below about 35° C., which may be accomplished by the cooling effect of the vacuum crystallization of the potassium sulfate crystals. Sodium chloride is then added to the mother liquor, and as the amount of potassium chloride which can be held in solution decreases, potassium chloride crystals begin to form and drop out of solution. This phenomenon continues up to about the point "Z" on FIG. 1 which is near the point at which no more sodium chloride can be caused to go into solution (saturation point for sodium chloride). The amount of sodium chloride which is added should be limited to about 90% of saturation in practice to compensate for any production variations in feed stream compositions, temperatures, and other conditions. It must be realized that many variations can affect the results obtained, including ore quality and composition, contaminants, temperature variations and equipment condition.

In the actual process, it is important to keep the sodium chloride level in the mother liquor just below its saturation level so that the maximum salting out of potassium chloride can be obtained *without* passing any solid sodium salts back into the potassium sulfate reactors with recycled solid potassium salts. The undesirable mixed salt, glaserite ($Na_2SO_4.3K_2SO_4$), is formed when solid sodium chloride is carried back into the potassium sulfate reactor. Formation of glaserite constitutes a loss of $K_2O$ values and may result in a potash fertilizer product which is below standard fertilizer specifications for $K_2O$ values.

Operation under the flow system of FIG. 3 can be employed when the amount of end liquor generated by the "salting out" process exceeds the amount that can be used efficiently by the primary langbeinite/sylvite ore refining operations. The excess end liquor is evaporated to crystallize most of the dissolved potassium salts and most of the sodium chloride in a mixed crystal crop which also includes some leonite ($K_2SO_4.MgSO_4.4H_2O$) or schoenite ($K_2SO_4.MgSO_4.6H_2O$), depending on the temperature.

Evaporating to remove water by solar or thermal evaporation is contemplated, with solar evaporation being preferred for the energy cost savings realized. The crystallized mixed salts are separated from the concentrated end magnesium salt solution.

The mixed salts are then recycled to the "salting out" step disclosed herein, or returned to the primary langbeinite/sylvite ore refining circuit. Sodium chloride in the recovered mixed salt crystal crop dissolves when the mixed salts are returned to the dissolvers, and serves as the source of sodium chloride for the "salting out" process.

The mixed salt crystal crop contains sufficient sodium chloride to provide a source of this salt for the "salting out" operation when the NaCl tailings of primary ore refining operation do not provide enough sodium chloride for the "salting out" process. The mixed salt crystal crop is then circulated back to the dissolvers shown in FIG. 3 to provide sodium chloride needed for the salting out step.

Coincidentally, the mixed salt crystal crop returns additional potassium ($K_2O$) values into the potassium sulfate recovery system in the form of the leonite- or schoenite-type salts which contain $K_2SO_4$. The sodium chloride of the mixed salts dissolves in the mother liquor from $K_2SO_4$ reaction tanks, but the potassium chloride and the leonite ($K_2SO_4.MgSO_4.4H_2O$) remain as solids in the mother liquor, and are recycled back to the reaction tanks with the recovered KCl where they become dissolved at the higher temperature (@55° C.) and react with KCl according to the conventional reaction set forth above to cause the formation of more $K_2SO_4$ crystals. The overall yield of potassium ($K_2O$) values is thereby increased, and sodium chloride is conveniently separated from the mixed crystal crop by recycling it back to the dissolvers for the "salting out" step.

DESCRIPTION OF THE PREFERRED EMBODIMENT

Example 1

In a calculated example, which is scaled up from laboratory tests, 393 tons of commercial grade muriate of potash (KCl) is dissolved in 1388 tons of water. After removing clay insolubles, the KCl solution is mixed with 441 tons of pulverized langbeinite ($K_2SO_4.2MgSO_4$ plus @4% NaCl) and 198 tons of potassium chloride (KCl) is recovered from the salting out step as described below. This mixture is reacted for four to six hours at about 55° C., to convert the langbeinite and potassium chloride to potassium sulfate ($K_2SO_4$). The reaction is conducted in reaction tanks connected in series.

Slurry from the reaction tanks (2420 tons) is centrifuged. 395 Tons of centrifuge cake ($K_2SO_4$ product) is produced. This material, after drying, yields 369 tons of agricultural grade potassium sulfate which is dispatched to product storage. Mother liquor (centrifuge effluent—2025 tons), after cooling to 30°-35° C., flows to the salting out step.

In the salting out step, 201 tons of tailings salt (NaCl) from the primary refining operations is agitated in the mother liquor for at least 15 minutes. Potassium salts (198 tons) crystallized in this step are separated from the solution and recycled to the reaction step. Solution remaining after separation of the potassium salts is sent to the primary ore refining operations. 2028 Tons of end liquor are generated in the process. The compositions of the various components of the system are set forth below.

| Component: | Compositions - Wt % | | | | | | | |
|---|---|---|---|---|---|---|---|---|
| | K | Mg | Na | Ca | Cl | SO$_4$ | Insol | H$_2$O |
| KCl | 48.8 | 0.6 | 1.2 | — | 46.6 | 2.4 | 0.4 | |
| Langbeinite | 17.8 | 10.9 | 1.1 | 0.4 | 2.1 | 65.6 | 1.2 | 0.9 |
| K$_2$SO$_4$ Product | 41.8 | 0.3 | Tr. | 1.4 | 54.2 | 1.6 | | |
| K$_2$SO$_4$ Mother Liquor | 10.0 | 2.5 | 0.5 | — | 13.3 | 5.0 | | 68.7 |
| NaCl Tailings | 0.6 | 0.3 | 35.6 | 0.3 | 56.1 | 0.7 | 0.2 | 6.2 |
| Crystallized K Salts | 42.9 | 0.5 | 0.8 | 0.3 | 40.7 | 1.0 | 0.3 | 13.5 |
| End Solution to Refinery | 5.8 | 2.5 | 4.0 | | 14.8 | 4.9 | | 68.0 |

The example cited above is the calculated theoretical yield scaled up to a commercial level. Variations in ore quality, purity, equipment performance and other factors, including temperature variation, can affect the yield and quality of product. It can be seen from the above analysis that a high quality potassium sulfate product can be obtained containing only a trace of sodium under ideal conditions.

Example 2

An idealized material balance was prepared for this example to illustrate how the process works with an evaporation step added to recover potassium salts from the MgCl$_2$ solution obtained in the salting out process.

In this modified version, 254 tons of commercial grade potassium chloride (KCl) are dissolved in 1342 tons of water. After removing the clay insolubles, the KCl solution is mixed with 379 tons of pulverized langbeinite ($K_2SO_4.2MgSO_4$ plus 4% NaCl) and 453 tons of potassium salts recovered from the salting out process and, indirectly from a final evaporation operation. The reaction process is conducted as described in Example 1.

Slurry from the reaction tanks (2428 tons) is centrifuged. 403 Tons of centrifuge cake is produced. This material, after drying, produces 377 tons of agricultural grade K$_2$SO$_4$ which is sent to storage. Mother liquor (centrifuge effluent—2025 tons) after cooling to 30°-35° C. flows to the salting out step.

In the salting out step, potassium—sodium salts recovered from an evaporation operation, 456 tons, are agitated in the mother liquor for at least 15 minutes. Potassium salts, present in the salts recovered by evaporation of the end liquor and crystallized by the salting out effect (453 tons) are separated from the solution and recycled to the primary reaction step.

Liquor from the salting out process (2028 tons) is evaporated, causing sodium chloride and desirable potassium salts to crystallize. To obtain maximum potassium salt yield, the final temperature of the salt—liquor phase mixture should be as low as possible. For material balance purposes, 25° C. was selected as the lowest feasible temperature for a commercial operation. Evaporation requirement for this example is 817 tons of water. 453 Tons of Na-K salts are crystallized. 758 Tons of concentrated MgCl$_2$ solution is produced which is rejected from the system to other uses. Overall recovery of potassium values as potassium sulfate product is in the 90% range. Analyses of the various components of the system are set forth below.

| Component: | Wt % | | | | | | | |
|---|---|---|---|---|---|---|---|---|
| | K | Mg | Na | Ca | Cl | SO$_4$ | Insol | H$_2$O |
| KCl | 48.8 | 0.6 | 1.2 | — | 46.6 | 2.4 | 0.4 | |
| Langbeinite | 17.8 | 10.9 | 1.1 | 0.4 | 2.1 | 65.6 | 1.2 | 0.9 |
| K$_2$SO$_4$ Product | 41.8 | 0.3 | Tr. | 0.7 | 1.4 | 54.2 | 1.6 | |
| K$_2$SO$_4$ Mother Liquor | 10.0 | 2.5 | 0.5 | — | 13.3 | 5.0 | — | 68.7 |
| Recycled K Salts: | | | | | | | | |
| Liquor to Evaporators | 5.8 | 2.5 | 4.0 | — | 14.8 | 4.9 | | 68.0 |
| K—Na Salt Crystal Crop | 22.8 | 1.6 | 15.6 | | 39.2 | 13.4 | | 7.4 |
| Reject MgCl$_2$ Solution | 2.6 | 5.6 | 1.7 | | 17.2 | 5.7 | | 67.2 |

The evaporation step is preferably accomplished by solar evaporation in ponds, and the remaining salts (Na, K) are harvested. These sodium potassium salts from the evaporation step are recycled back to the "salting out" step as described above. The mixed potassium-sodium crystal crop obtained from the solar evaporation step may also be returned to the primary langbeinite/sylvinite ore refining step under some circumstances. Care must be taken to avoid adding an excess of sodium back into the system at this point to avoid the formation of glaserite.

We claim:

1. In an improved process for obtaining potassium sulfate from potassium bearing ores in which a primary potassium bearing ore refining process includes the step of adding potassium chloride to langbeinite ($K_2SO_4.2Mg-SO_4$) to form a reaction mixture which produces potassium sulfate salt crystals and a mother liquor containing dissolved chloride and sulfate salts of potassium and magnesium which remains after the removal of potassium sulfate salt crystals therefrom, the improvement comprising adding sodium chloride to said mother liquor up to an amount just below the saturation point for sodium chloride in said mother liquor to cause precipitation of potassium chloride crystals from said mother liquor, and thereafter separating the potassium chloride crystals from said mother liquor leaving an end liquor containing salts of magnesium, potassium and sodium.

2. The process of claim 1, in which the potassium chloride crystals are recycled back to the potassium sulfate initial reaction mixture.

3. The process of claim 1, in which the potassium chloride crystals are recycled back to the primary potassium bearing ore refining process.

4. The process of claim 1, in which end liquor remaining after the separation of potassium chloride crystals from the mother liquor is recycled back to primary potassium-bearing ore refining process.

5. The process of claim 1, in which at least a portion of the end liquor remaining after the separation of potassium chloride crystals from the mother liquor is subjected to evaporation to recover additional mixed crystals of chloride and sulfate salts of potassium and sodium therefrom, and leaving an end liquor of concentrated magnesium chloride, said mixed crystals of chloride and sulfate salts of potassium and sodium being separated from said end liquor and recycled back to the mother liquor in the primary potassium bearing ore refining process to provide additional sodium chloride to cause further precipitation of potassium chloride from the mother liquor, and to thereby recover additional potassium chloride from said end liquor.

6. The process of claim 5, in which the concentrated magnesium chloride solution from said evaporation step is recycled to the primary potassium bearing ore refining process.

7. The process of claim 5, in which at least a portion of said mixed crystals of potassium and sodium salts are recycled back to the primary potassium bearing ore refining process.

8. The process of claims 1–7, in which the potassium bearing ores contain langbeinite and sylvite with halite impurities.

9. The process of claim 1, in which the potassium bearing ores contain langbeinite and sylvite with halite impurities, and the mother liquor is cooled to a temperature below 35° C. prior to the addition of sodium chloride.

10. A method of removing potassium chloride from an aqueous solution containing potassium chloride and magnesium chloride, comprising the step of adding sodium chloride to said aqueous solution up to an amount just below the saturation point for sodium chloride to thereby displace potassium chloride in said aqueous solution and cause the formation of potassium chloride crystals which precipitate from said aqueous solution, leaving an end liquor containing sodium chloride, magnesium chloride and unprecipitated potassium salts.

11. The method of claim 10, including the step of separating the potassium chloride crystals from said aqueous solution.

12. The method of claim 11, including the step of adding the potassium chloride crystals to a primary langbeinite ore refining reaction mixture, said reaction mixture comprising an aqueous solution of langbeinite ($K_2SO_4.2MgSO_4$) ore and potassium chloride which react to form potassium sulfate ($K_2SO_4$) crystals and a mother liquor containing dissolved chloride and sulfate salts of potassium and magnesium.

13. The method of claim 12, in which the concentrated solution of magnesium chloride is added back to the primary langbeinite ore refining reaction mixture to provide additional potassium salts and magnesium chloride thereto.

14. The method of claim 11, in which the aqueous solution remaining after displacement of potassium chloride therefrom is further concentrated to cause precipitation of sodium chloride therefrom.

15. The method of claim 11, in which the end liquor remaining after displacement of potassium chloride therefrom is further concentrated by means of solar evaporation to cause precipitation of sodium chloride therefrom, leaving a concentrated solution of magnesium chloride and some potassium salts and including the additional step of adding said precipitated sodium chloride back to said solution of potassium chloride and magnesium chloride to thereby precipitate additional potassium chloride crystals therefrom.

* * * * *

UNITED STATES PATENT AND TRADEMARK OFFICE
CERTIFICATE OF CORRECTION

PATENT NO. : 4,334,885
DATED : June 15, 1982
INVENTOR(S) : Marvin H. Harrison et al It is certified that error appears in the above-identified patent and that said Letters Patent are hereby corrected as shown below:

Column 1, line 17, "poatssium" should read -- potassium --

Column 5, line 40, in the column headed Ca, "1.4" should read -- 0.7 --

Column 5, line 40, in the column headed Cl, "54.2" should read -- 1.4 --

Column 5, line 40, in the column headed $SO_4$, "1.6" should read -- 54.2 --

Column 5, line 40, in the column headed Insol, "-" should read -- 1.6 --

Signed and Sealed this

First Day of February 1983

|SEAL|

Attest:

Attesting Officer

GERALD J. MOSSINGHOFF
Commissioner of Patents and Trademarks